United States Patent
Fujishiro et al.

(10) Patent No.: US 10,499,377 B2
(45) Date of Patent: Dec. 3, 2019

(54) BASE STATION AND USER TERMINAL

(71) Applicant: KYOCERA CORPORATION, Kyoto (JP)

(72) Inventors: Masato Fujishiro, Yokohama (JP); Hiroyuki Adachi, Kawasaki (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/222,631

(22) Filed: Jul. 28, 2016

(65) Prior Publication Data
US 2016/0366676 A1 Dec. 15, 2016

Related U.S. Application Data

(63) Continuation of application No. PCT/JP2015/081214, filed on Nov. 5, 2015.
(Continued)

(51) Int. Cl.
*H04W 4/00* (2018.01)
*H04W 72/04* (2009.01)
(Continued)

(52) U.S. Cl.
CPC ....... *H04W 72/0406* (2013.01); *H04L 67/104* (2013.01); *H04W 76/14* (2018.02); *H04W 8/005* (2013.01); *H04W 92/18* (2013.01)

(58) Field of Classification Search
CPC ........... H04W 72/042; H04W 72/0453; H04W 72/0413; H04L 5/0053; H04L 5/0007
(Continued)

(56) References Cited

U.S. PATENT DOCUMENTS

| | | |
|---|---|---|
| 2013/0210429 A1 | 8/2013 | Aoyagi et al. |
| 2014/0056220 A1* | 2/2014 | Poitau .................. H04W 76/14 370/328 |

(Continued)

FOREIGN PATENT DOCUMENTS

WO 2012/020808 A1 2/2012

OTHER PUBLICATIONS

International Search Report issued in PCT/JP2015/081214; dated Jan. 19, 2016.
(Continued)

*Primary Examiner* — Atique Ahmed
(74) *Attorney, Agent, or Firm* — Studebaker & Brackett PC

(57) ABSTRACT

A user terminal executes processes of receiving control information from a base station, the control information indicating that transmission of a gap request is allowed; transmitting a reception gap request to the base station, the reception gap request requesting reception gaps which are timings in which the user terminal halts a downlink reception to monitor device-to-device discovery signals directly transmitted from other user terminals; and receiving a gap configuration from the base station, the gap configuration indicating the reception gaps configured by the base station to the user terminal. The reception gap request includes a frequency identifier indicating a frequency for monitoring the device-to-device discovery signals; and correlated gap pattern. The gap pattern includes bit map information indicating subframes corresponding to the reception gaps; period information indicating a repeating period of the bit map information; and offset information indicating a start timing of the period.

11 Claims, 10 Drawing Sheets

Related U.S. Application Data

(60) Provisional application No. 62/076,730, filed on Nov. 7, 2014.

(51) Int. Cl.
*H04W 76/14* (2018.01)
*H04L 29/08* (2006.01)
*H04W 92/18* (2009.01)
*H04W 8/00* (2009.01)

(58) Field of Classification Search
USPC .......................................................... 370/329
See application file for complete search history.

(56) References Cited

U.S. PATENT DOCUMENTS

| | | | | |
|---|---|---|---|---|
| 2014/0185529 A1* | 7/2014 | Lim | ...................... | H04W 8/005 370/328 |
| 2014/0204898 A1* | 7/2014 | Yang | ...................... | H04W 8/005 370/330 |
| 2014/0287753 A1* | 9/2014 | Schulist | ............ | H04W 36/0022 455/436 |
| 2014/0342747 A1* | 11/2014 | Lee | ...................... | H04L 5/0053 455/450 |
| 2015/0098414 A1* | 4/2015 | Kuo | ...................... | H04W 72/10 370/329 |
| 2015/0215903 A1* | 7/2015 | Zhao | ...................... | H04W 72/04 370/329 |
| 2015/0312775 A1* | 10/2015 | Yi | ........................ | H04W 16/00 370/254 |
| 2016/0014590 A1* | 1/2016 | Agiwal | ................. | H04W 8/005 455/426.1 |
| 2016/0183167 A1* | 6/2016 | Agiwal | ................. | H04W 48/16 370/329 |
| 2016/0330604 A1* | 11/2016 | Kim | ....................... | H04W 74/00 |
| 2017/0230815 A1* | 8/2017 | Yasukawa | ............. | H04W 76/14 |

OTHER PUBLICATIONS

Written Opinion issued in PCT/JP2015/081214; dated Jan. 19, 2016.

3rd Generation Partnership Project; Technical Specification Group Radio Access Network; Study on LTE Device to Device Proximity Services; Radio Aspects; 3GPP TR 36.843 V12.0.1; Mar. 2014; pp. 1-50; Release 12; 3GPP Organizational Partners.

InterDigital Communications; Configuration Aspects for ProSe Discovery; 3GPP TSG-RAN WG2 #87bis; R2-144541; Oct. 6-10, 2014; Shanghai, China.

Kyocera; Inter-PLMN D2D discovery; 3GPP TSG-RAN WG2 #87; R2-143756; Aug. 18-22, 2014; Dresden, Germany.

Samsung; Remaining Issues of dedicated SIB-1 delivery in FeICIC; 3GPP TSG-RAN2#79Bis; R2-124885; Oct. 8-12, 2012; Bratislava.

Panasonic; Clarification on resource pool configuration; 3GPP TSG RAN WG1 Meeting #78bis; R1-144102; Oct. 6-10, 2014; Ljubljana, Slovenia.

Kyocera; Inter-frequency and inter-PLMN 020 discovery; 3GPP TSG-RAN WG2 #87bis; R2-144534; Oct. 6-10, 2014; total 9 pages; Shanghai, China.

Sony; Inter-frequency and inter-PLMN discovery resource; 3GPP TSG-RAN WG2 Meeting #87bis; R2-144400; Oct. 6-10, 2014; total 3 pages; Shanghai, China.

* cited by examiner

BASE STATION AND USER TERMINAL

CROSS REFERENCE

This application claims the benefit of U.S. Provisional Application No. 62/076,730 filed on Nov. 7, 2014, the entire contents of which are incorporated herein by reference.

FIELD

The present disclosure relates to a base station and a user terminal used in a mobile communication system in which a D2D proximity service is supported.

BACKGROUND

In the 3rd Generation Partnership Project (3GPP) that is a mobile communication system standardization project, introduction of a device-to-device (D2D) proximity service as a new function after Release 12 is under review (see Non Patent Literature 1).

The D2D proximity service (D2D ProSe) is a service that enables direct D2D communication to be performed in a synchronous cluster including a plurality of user terminals which are synchronized with one another. The D2D proximity service includes a D2D discovery process (ProSe Discovery) of discovering a nearby terminal and D2D communication (ProSe Communication) that is direct D2D communication.

Here, a serving cell can notify a user terminal of another frequency that supports the D2D proximity service and is different from a frequency of the serving cell through system information (a system information block (SIB)). The user terminal may monitor a D2D signal that is transmitted at another frequency that is notified of through the SIB.

SUMMARY

A user terminal according to a first aspect includes a controller containing at least one processor and at least one memory. The controller configured to execute processes of: receiving control information from a base station, the control information indicating that transmission of a gap request is allowed; transmitting a reception gap request to the base station, the reception gap request requesting reception gaps which are timings in which the user terminal halts a downlink reception to monitor device-to-device discovery signals directly transmitted from other user terminals; and receiving a gap configuration from the base station, the gap configuration indicating the reception gaps configured by the base station to the user terminal. The reception gap request includes: a frequency identifier indicating a frequency to be used for monitoring the device-to-device discovery signals; and a gap pattern correlated with the frequency identifier. The gap pattern includes: bit map information indicating subframes corresponding to the reception gaps; period information indicating a predetermined period by which the bit map information is repeated; and offset information indicating a start timing of the predetermined period.

A base station according to a second aspect includes a controller containing at least one processor and at least one memory. The controller configured to execute processes of: transmitting control information to a user terminal, the control information indicating that transmission of a gap request is allowed; receiving a reception gap request from the user terminal, the reception gap request requesting reception gaps which are timings in which the user terminal halts a downlink reception to monitor device-to-device discovery signals directly transmitted from other user terminals; and transmitting a gap configuration to the user terminal, the gap configuration indicating the reception gaps configured by the base station to the user terminal. The reception gap request includes: a frequency identifier indicating a frequency to be used for monitoring the device-to-device discovery signals; and a gap pattern correlated with the frequency identifier. The gap pattern includes: bit map information indicating subframes corresponding to the reception gaps; period information indicating a predetermined period by which the bit map information is repeated; and offset information indicating a start timing of the predetermined period.

An apparatus according to a third aspect is an apparatus for a user terminal. The apparatus includes at least one processor and at least one memory. The at least one processor is configured to cause the user terminal to execute processes of: receiving control information from a base station, the control information indicating that transmission of a gap request is allowed; transmitting a reception gap request to the base station, the reception gap request requesting reception gaps which are timings in which the user terminal halts a downlink reception to monitor device-to-device discovery signals directly transmitted from other user terminals; and receiving a gap configuration from the base station, the gap configuration indicating the reception gaps configured by the base station to the user terminal. The reception gap request includes: a frequency identifier indicating a frequency to be used for monitoring the device-to-device discovery signals; and a gap pattern correlated with the frequency identifier. The gap pattern includes: bit map information indicating subframes corresponding to the reception gaps; period information indicating a predetermined period by which the bit map information is repeated; and offset information indicating a start timing of the predetermined period.

DETAILED DESCRIPTION

[Overview of Embodiment]

Figure 1:
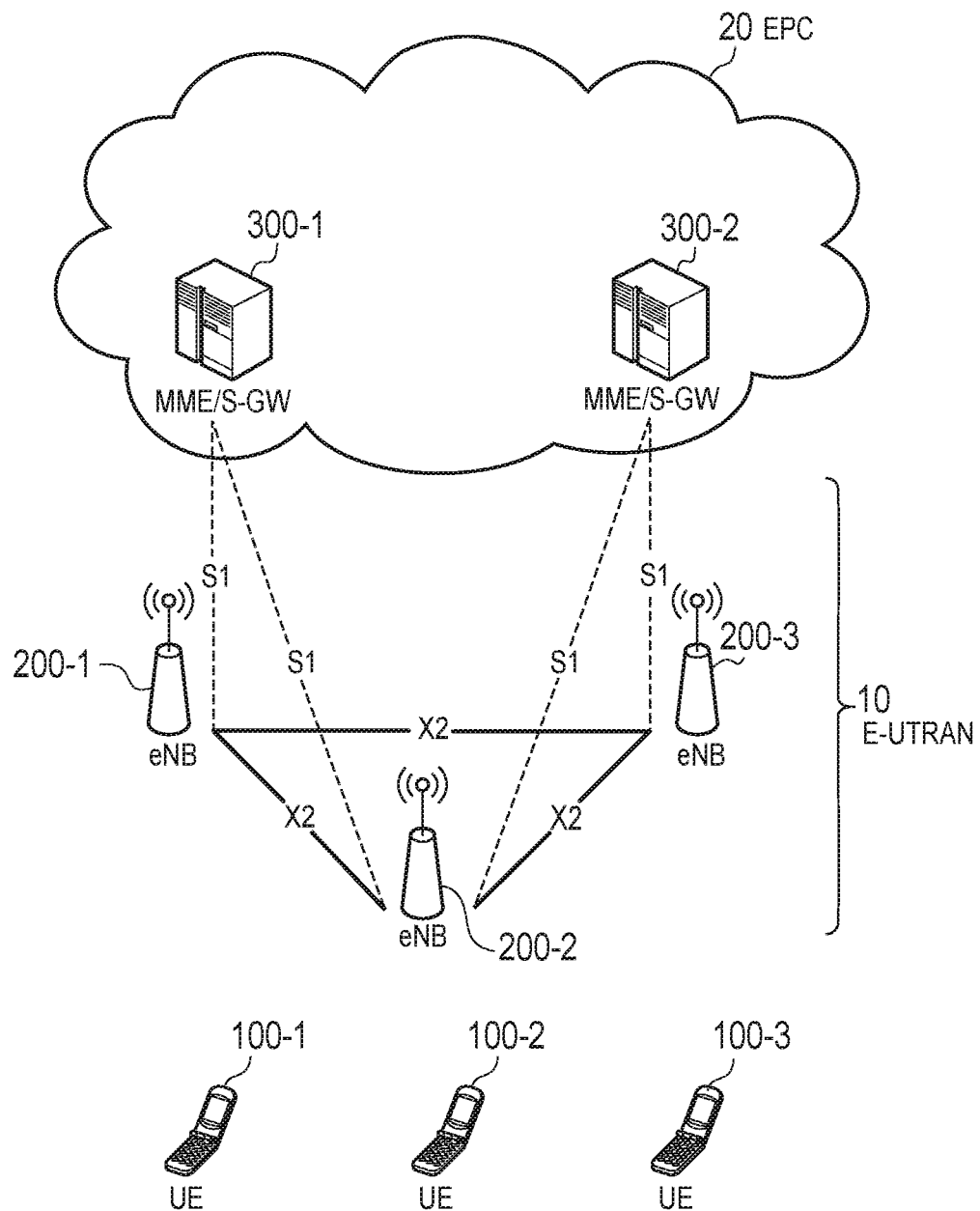
FIG. 1 is a configuration diagram illustrating an LTE system.

Time/frequency resources (D2D resource pool) used for transmission of the D2D signal are assumed to be set to a specific time zone delimited by a predetermined period of time other than all time zones.

The user terminal receives a notification of another frequency at which the D2D proximity service is supported from the serving cell but does not receive a notification of the D2D resource pool used for transmission of the D2D signal from the serving cell.

Further, it is commonly difficult for the user terminal to perform monitoring of the D2D signal and cellular communication at the same time, and thus it may be desirable that the D2D signal that is transmitted at another frequency can be appropriately monitored.

In this regard, an embodiment provides a base station and a user terminal, which are capable of appropriately monitoring the D2D signal transmitted at another frequency different from the frequency of the serving cell.

A base station according to an embodiment includes: a controller configured to allocate a gap pattern for a device-to-device (D2D) proximity service to a user terminal connected to a cell of the base station based on a message received from the user terminal. The gap pattern specifies a timing at which the user terminal is permitted to monitor a D2D signal transmitted from another user terminal at another frequency different from a frequency of the cell. The controller transmits feedback control information to the user terminal. The feedback control information is used to determine whether or not it is necessary for the user terminal to include, in the message, feedback corresponding to system information that is received by the user terminal at a predetermined frequency.

In an embodiment, the system information includes resource pool information indicating a D2D resource pool used for transmission of the D2D signal at the other frequency. The feedback is a requested gap pattern that is decided by the user terminal based on the resource pool information or the resource pool information.

In an embodiment, the feedback control information includes information indicating whether or not the feedback is necessary.

In an embodiment, the system information includes a tag number that is updated with an update of the system information. The feedback control information includes the tag number of the system information acquired by the base station.

In an embodiment, the feedback control information includes information indicating a gap pattern acquired by the base station.

In an embodiment, the feedback control information is provided for each frequency included in the predetermined frequency.

In an embodiment, the feedback control information includes information indicating a valid period of time of the feedback control information.

A user terminal according to an embodiment includes: a controller configured to be allocated a gap pattern for a device-to-device (D2D) proximity service from a serving cell based on a message that is transmitted from the user terminal to the serving cell. The gap pattern specifies a timing at which the user terminal is permitted to monitor a D2D signal transmitted from another user terminal at another frequency different from a frequency of the cell. The controller receives feedback control information from the serving cell. The feedback control information is used to determine whether or not it is necessary for the user terminal to include, in the message, feedback corresponding to system information received by the user terminal at a predetermined frequency.

In an embodiment, the system information includes resource pool information indicating a D2D resource pool used for transmission of the D2D signal at the other frequency. The feedback is a requested gap pattern that is decided by the user terminal based on the resource pool information or the resource pool information.

In an embodiment, the feedback control information includes information indicating whether or not the feedback is necessary.

In an embodiment, the system information includes a tag number that is updated with an update of the system information. The feedback control information includes the tag number of the system information acquired by the base station.

In an embodiment, the feedback control information includes information indicating a gap pattern acquired by the base station.

In an embodiment, the feedback control information is provided for each frequency included in the predetermined frequency.

In an embodiment, the feedback control information includes information indicating a valid period of time of the feedback control information.

[Embodiments]

Hereinafter, an embodiment for a case where the present disclosure is applied to an LTE system will be explained.

(1) System Configuration

Hereinafter, the system configuration of the LTE system according to an embodiment will be explained. FIG. 1 is a configuration diagram of the LTE system according to the embodiment. As illustrated in FIG. 1, the LTE system according to the embodiment includes UE (User Equipment) 100, E-UTRAN (Evolved-UMTS Terrestrial Radio Access Network) 10, and EPC (Evolved Packet Core) 20.

The UE 100 corresponds to a user terminal The UE 100 is a mobile communication device, which performs radio communication with a cell (a serving cell). The configuration of the UE 100 will be described later.

The E-UTRAN 10 corresponds to a radio access network. The E-UTRAN 10 includes an eNB 200 (evolved Node-B). The eNB 200 corresponds to a base station. The eNBs 200 are connected mutually via an X2 interface. The configuration of the eNB 200 will be described later.

The eNB 200 manages one or a plurality of cells, and performs radio communication with the UE 100 that establishes a connection with a cell of the eNB 200. The eNB 200 has a radio resource management (RRM) function, a routing function of user data, a measurement control function for mobility control and scheduling and the like. The "cell" is used as a term indicating a smallest unit of a radio communication area, and is also used as a term indicating a function of performing radio communication with the UE 100.

The EPC 20 corresponds to a core network. The network of LTE system is configured by the E-UTRAN 10 and the EPC 20. The EPC 20 includes an MME (Mobility Management Entity)/S-GW (Serving-Gateway) 300. The MME performs different types of mobility control and the like for the UE 100. The S-GW performs transfer control of the user data. The MME/S-GW 300 is connected to the eNB 200 via an S1 interface.

Figure 2:
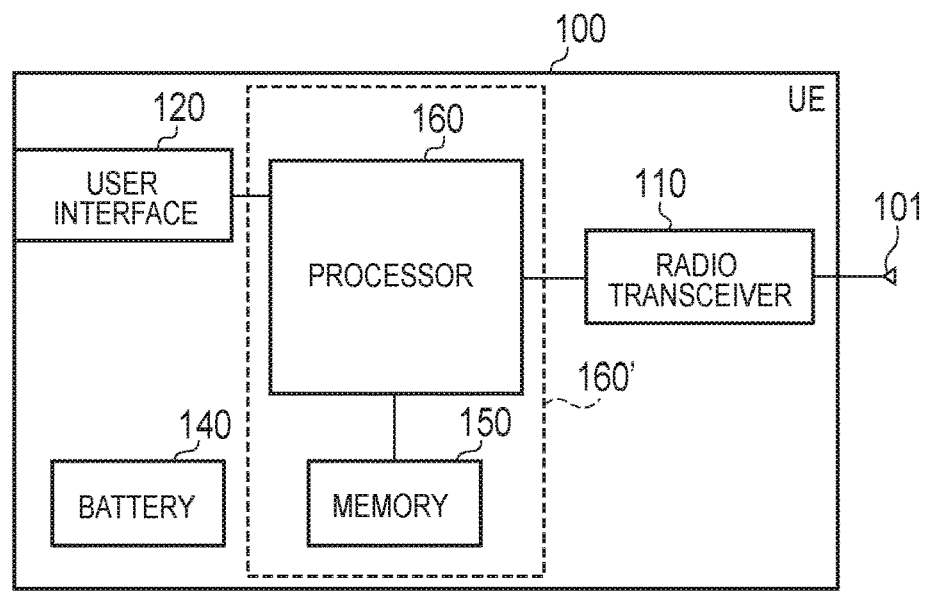
FIG. 2 is a block diagram illustrating a UE (user terminal).

FIG. 2 is a block diagram of the UE 100. As illustrated in FIG. 2, the UE 100 includes an antenna 101, a radio transceiver 110, a user interface 120, a battery 140, a memory 150, and a processor 160. The memory 150 corresponds to a storage, and the processor 160 corresponds to a controller. The memory 150 may be integrally formed with the processor 160, and this set (that is, a chip set) may be called a processor 160' forming the controller.

The antenna 101 and the radio transceiver 110 are used to transmit and receive a radio signal. The radio transceiver 110 converts a baseband signal (a transmission signal) output from the processor 160 into the radio signal and transmits the radio signal from the antenna 101. Furthermore, the radio transceiver 110 converts a radio signal received by the antenna 101 into a baseband signal (a received signal), and outputs the baseband signal to the processor 160. The radio transceiver 110 and the processor 160 form a transmitter and a receiver.

The radio transceiver 110 may plural transmitters and/or plural receivers. In an embodiment, a case where the transceiver 110 includes a transmitter and a receiver is assumed.

The user interface 120 is an interface with a user carrying the UE 100, and includes, for example, a display, a microphone, a speaker, various buttons and the like. The user interface 120 receives an operation from a user and outputs a signal indicating the content of the operation to the processor 160. The battery 140 accumulates a power to be supplied to each block of the UE 100. If the UE 100 is a card-type-terminal, the UE 100 may not include the user interface 120 and the battery 140.

The memory 150 stores a program to be executed by the processor 160 and information to be used for processing by the processor 160. The processor 160 includes a baseband processor that performs modulation and demodulation, encoding and decoding and the like on the baseband signal, and a CPU (Central Processing Unit) that performs various processes by executing the program stored in the memory 150. The processor 160 may further include a codec that performs encoding and decoding on sound and video signals. The processor 160 executes various types of processes and various communication protocols described later. In accordance with various embodiments, the at least one processor 160 may be implemented as a single integrated circuit (IC) or as multiple communicatively coupled IC's and/or discrete circuits. It is appreciated that the at least one processor 160 can be implemented in accordance with various known technologies. In one embodiment, the processor 160 includes one or more circuits or units configurable to perform one or more data computing procedures or processes by executing instructions stored in an associated memory, for example. In other embodiments, the processor 160 may be implemented as firmware (e.g. discrete logic components) configured to perform one or more data computing procedures or processes. In accordance with various embodiments, the processor 160 may include one or more processors, controllers, microprocessors, microcontrollers, application specific integrated circuits (ASICs), digital signal processors, programmable logic devices, field programmable gate arrays, or any combination of these devices or structures, or other known devices and structures, to perform the functions described herein.

Figure 3:
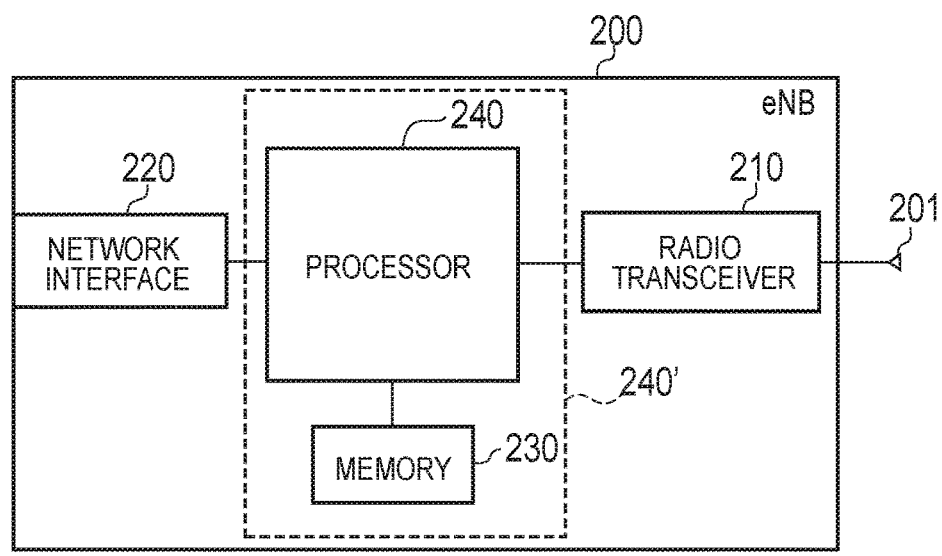
FIG. 3 is a block diagram illustrating an eNB (base station).

FIG. 3 is a block diagram of the eNB 200. As illustrated in FIG. 3, the eNB 200 includes an antenna 201, a radio transceiver 210, a network interface 220, a memory 230, and a processor 240. The memory 230 corresponds to a storage, and the processor 240 corresponds to a controller. Furthermore, the memory 230 may be integrally formed with the processor 240, and this set (that is, a chipset) may be called a processor 240' forming the controller.

The antenna 201 and the radio transceiver 210 are used to transmit and receive a radio signal. The radio transceiver 210 converts a baseband signal (a transmission signal) output from the processor 240 into the radio signal and transmits the radio signal from the antenna 201. Furthermore, the radio transceiver 210 converts a radio signal received by the antenna 201 into a baseband signal (a received signal), and outputs the baseband signal to the processor 240. The radio transceiver 210 and the processor 240 form a transmitter and a receiver.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for processing by the processor 240. The processor 240 includes a baseband processor that performs modulation and demodulation, encoding and decoding and the like on the baseband signal and a CPU that performs various processes by executing the program stored in the memory 230. The processor 240 executes various types of processes and various communication protocols described later.

Figure 4:
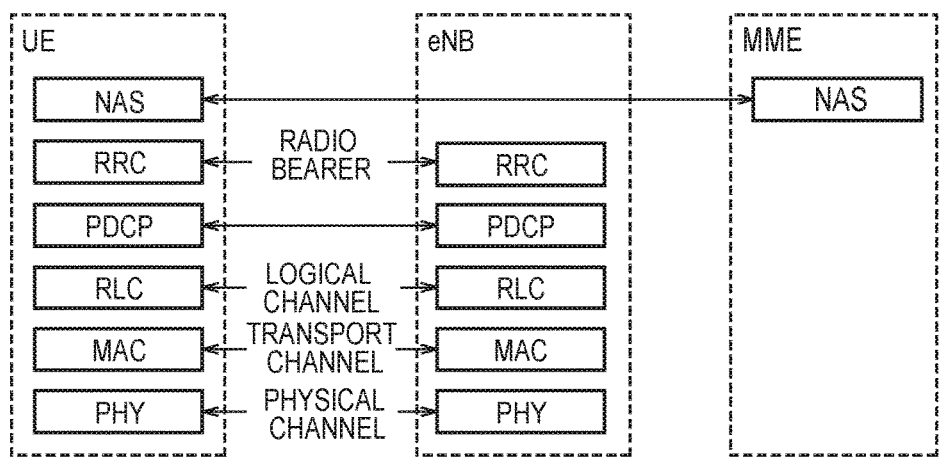
FIG. 4 is a protocol stack diagram of a radio interface in an LTE system.

FIG. 4 is a protocol stack diagram of a radio interface in the LTE system. As shown in FIG. 4, the radio interface protocol is classified into a first layer to a third layer of an OSI reference model. The first layer is a physical (PHY) layer. The second layer includes a MAC (Medium Access Control) layer, an RLC (Radio Link Control) layer, and a PDCP (Packet Data Convergence Protocol) layer. The third layer includes an RRC (Radio Resource Control) layer.

The physical layer performs encoding and decoding, modulation and demodulation, antenna mapping and demapping, and resource mapping and demapping. Between the physical layer of the UE 100 and the physical layer of the eNB 200, user data and control signals are transmitted via a physical channel.

The MAC layer performs priority control of data, a retransmission process by a hybrid ARQ (HARQ) and the like. Between the MAC layer of the UE 100 and the MAC layer of the eNB 200, user data and control signals are transmitted via a transport channel. The MAC layer of the eNB 200 includes a scheduler for determining (scheduling) a transport format (a transport block size and a modulation and coding scheme) of an uplink and a downlink, and a resource block to be assigned to the UE 100.

The RLC layer transmits data to an RLC layer of a reception side by using the functions of the MAC layer and the physical layer. Between the RLC layer of the UE 100 and the RLC layer of the eNB 200, user data and control signals are transmitted via a logical channel.

The PDCP layer performs header compression and decompression, and encryption and decryption.

The RRC layer is defined only in a control plane that handles control signals. Between the RRC layer of the UE 100 and the RRC layer of the eNB 200, a control signal (an RRC message) for various types of settings is transmitted. The RRC layer controls the logical channel, the transport channel, and the physical channel according to the establishment, re-establishment, and release of a radio bearer. When there is a connection (an RRC connection) between the RRC of the UE 100 and the RRC of the eNB 200, the UE 100 is in an RRC connected mode. Otherwise, the UE 100 is in an RRC idle mode.

An NAS (Non-Access Stratum) layer positioned above the RRC layer performs session management, mobility management and the like.

Figure 5:
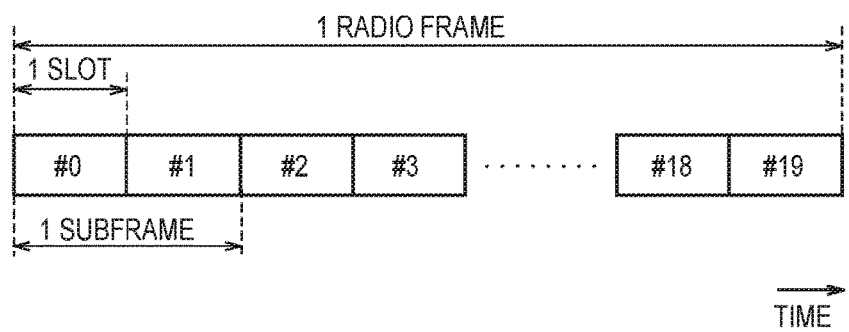
FIG. 5 is a configuration diagram illustrating a radio frame used in an LTE system.

FIG. 5 is a configuration diagram of a radio frame used in the LTE system. In the LTE system, OFDMA (Orthogonal Frequency Division Multiple Access) is applied to a downlink, and SC-FDMA (Single Carrier Frequency Division Multiple Access) is applied to an uplink, respectively.

As illustrated in FIG. 5, a radio frame is configured by 10 subframes arranged in a time direction. Each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each resource block includes a plurality of subcarriers in the frequency direction. One subcarrier and one symbol form one resource element. Of the radio resources (time and frequency resources) assigned to the UE 100, a frequency resource can be identified by a resource block and a time resource can be identified by a subframe (or a slot).

(2) D2D Proximity Service

The D2D proximity service will be described below. The LTE system according to an embodiment supports the D2D proximity service. An overview of the D2D proximity service will be here described.

The D2D proximity service (D2D ProSe) is a service that enables direct D2D communication to be performed in a synchronous cluster including a plurality of UEs 100 which are synchronized with one another. The D2D proximity service includes a D2D discovery process (ProSe Discovery) of discovering a nearby UE and D2D communication (ProSe Communication) that is direct inter-UE communication.

A scenario in which all the UEs 100 constituting the synchronous cluster are positioned within a cell coverage is referred to as "coverage." A scenario in which all the UEs 100 constituting the synchronous cluster are positioned out of the cell coverage is referred to as "out of coverage." A scenario in which some UEs 100 in the synchronous cluster are positioned within the cell coverage, and the remaining UEs 100 are positioned out of the cell coverage is referred to as "partial coverage."

In existing circumstances, the D2D discovery process is assumed to be performed only within the coverage. Hereinafter, a case in which the D2D discovery process is performed within the coverage is mainly assumed.

In the D2D discovery process, the UE 100 transmits a D2D discovery signal for discovering a nearby terminal As a D2D discovery process method, there are a first method (Type 1 discovery) in which radio resources that are not uniquely allocated to the UE 100 are used for transmission of the D2D discovery signal and a second method (Type 2 discovery) in which radio resources that are uniquely allocated to each UE 100 are used for transmission of the D2D discovery signal. In the second method, radio resources that are individually or semi-persistently allocated to each transmission of the D2D discovery signal are used.

Within the coverage, the eNB 200 functions as a D2D synchronization source. The eNB 200 transmits the SIB related to the D2D proximity service. Hereinafter, such a SIB is referred to as the SIB 19. The SIB 19 is a type of system information that is transmitted in a broadcast manner.

The SIB 19 includes resource pool information indicating a D2D discovery resource pool used for transmission of the D2D discovery signal in its own cell. The D2D discovery resource pool may individually include a transmission resource pool and a reception resource pool. The SIB 19 includes a frequency list indicating another frequency that is different from a frequency of its own cell but available for the D2D discovery process. The frequency list is used for the D2D discovery process (the inter-frequency discovery) between different frequencies.

(3) Inter-frequency Discovery

Figure 6:
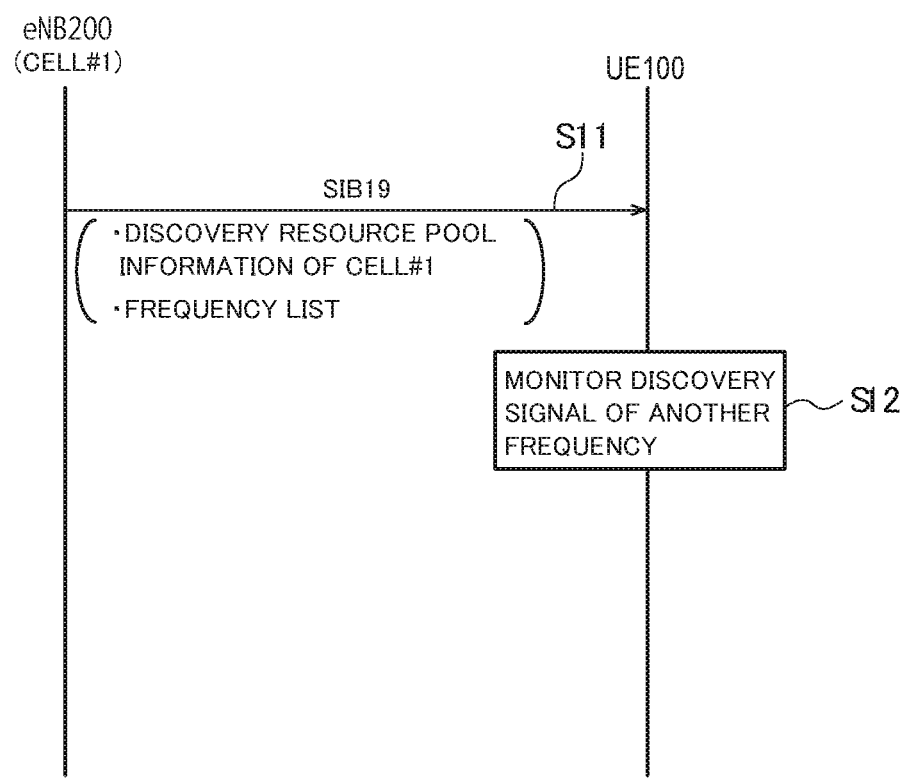
FIG. 6 is a diagram for describing inter-frequency discovery according to an embodiment.

The inter-frequency discovery will be described. FIG. 6 is a diagram for describing the inter-frequency discovery. In FIG. 6, the UE 100 is in a connected mode or an idle mode and selects a cell #1 of the eNB 200 as the serving cell.

As illustrated in FIG. 6, the eNB 200 transmits the SIB 19 (system information) through the cell #1. As described above, the SIB 19 includes the resource pool information of the cell #1 and the frequency list indicating another frequency available for the D2D discovery process. The SIB 19 may include the resource pool information of a neighboring cell of the same frequency as the frequency of the cell #1. However, it should be noted that the SIB 19 does not include the resource pool information of another frequency different from the frequency of the cell #1. The UE 100 receives the SIB 19 through the cell #1.

The UE 100 monitors the D2D discovery signal that is transmitted at the frequency (another frequency) in the frequency list based on the frequency list included in the SIB 19. The frequency in the frequency list is different from the frequency of the cell #1, and it is difficult for the UE 100 to simultaneously perform monitoring of the D2D discovery signal and downlink cellular communication (communication with the cell #1). Thus, it may be desirable that the UE 100 monitor the D2D discovery signal in a period of time in which the downlink cellular communication is not performed so that the cellular communication is not interrupted by the monitoring of the D2D discovery signal.

For example, the UE 100 that performs intermittent reception (DRX) can monitor the D2D discovery signal of another frequency in an OFF period of time. The OFF period of time is a different period of time from an ON period of time in which a PDCCH of the cell #1 (the serving cell) is monitored. The eNB 200 detects the OFF period of time of the UE 100, and does not perform downlink transmission to the UE 100 in the OFF period of time. However, in this method, when the OFF period of time is short, an opportunity to monitor the D2D discovery signal of another frequency is small. Thus, it is hard to increase the success rate of the inter-frequency discovery.

In an embodiment, a new timing (a monitoring gap) in which the UE 100 monitors the D2D discovery signal of another frequency is introduced. The monitoring gap is allocated from the eNB 200 to the UE 100, and thus the success rate of the inter-frequency discovery can be increased.

(4) Monitoring Gap Allocation

Figure 7:
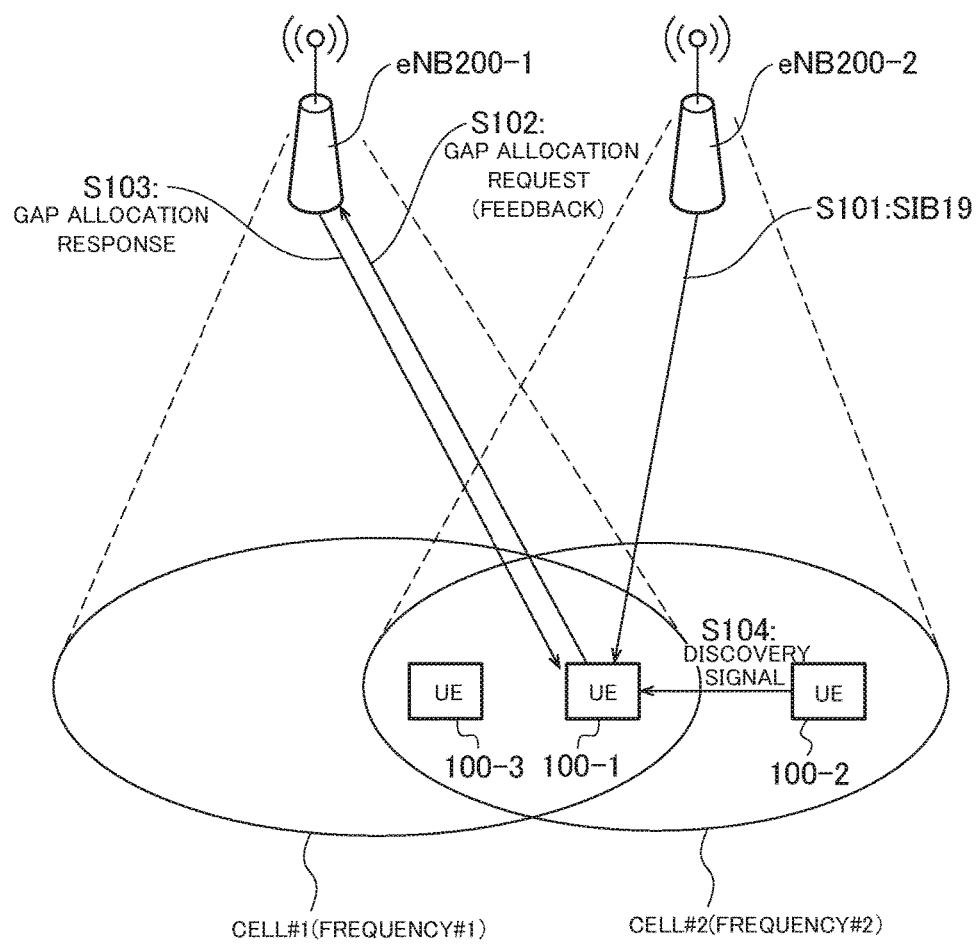
FIG. 7 is a diagram for describing monitoring gap allocation according to an embodiment.

A monitoring gap allocation according to an embodiment will be described below. FIG. 7 is a diagram for describing a monitoring gap allocation according to an embodiment.

As illustrated in FIG. 7, a cell #1 managed by an eNB 200-1 and a cell #2 managed by an eNB 200-2 overlap at least partially. The cell #1 belongs to a frequency #1, and the cell #2 belongs to a frequency #2. In other words, the cell #1 and the cell #2 differ in a frequency.

The cell #1 belongs to a public land mobile network (PLMN) #1, and the cell #2 belongs to a PLMN #2. In other words, the cell #1 and the cell #2 differ in a PLMN. In this case, it should be noted that it is difficult for the cell #1 and the cell #2 to perform inter-cell collaboration. In addition, the cell #1 and the cell #2 may not be synchronized with each other.

A UE 100-1 and a UE 100-3 exist in an overlapping region of the cell #1 and the cell #2, and select the cell #1 as the serving cell. A UE 100-2 exist in the cell #2, and selects the cell #2 as the serving cell.

A method of allocating the monitoring gap in which the UE 100-1 monitors the D2D discovery signal transmitted from the UE 100-2 in such an operation environment will be described.

First, the UE 100-1 receives the SIB 19 transmitted from the eNB 200-1 through the cell #1 and decodes the SIB 19. The SIB 19 includes the resource pool information of the cell #1 and the frequency list indicating another frequency available for the D2D discovery process. The UE 100-1 decides to perform the D2D discovery process at another frequency (the frequency of the cell #2) based on the frequency list. A state in which the UE 100-1 decides to perform the D2D discovery process, and the D2D discovery process does not start yet is referred to as a "state in which it becomes interested in D2D discovery process." However, a state in which the UE 100-1 is performing the D2D discovery process may be included in the "state in which it becomes interested in D2D discovery process."

In step S101, the eNB 200-2 transmits the SIB 19 through the cell #2. The SIB 19 includes the resource pool information of the cell #2 and the frequency list indicating another frequency available for the D2D discovery process. The UE 100-1 that becomes interested in the D2D discovery process at the frequency of the cell #2 receives the SIB 19 from the eNB 200-2 through the cell #2 and decodes the SIB 19. Here, it should be noted that the UE 100-1 receives and decodes the SIB 19 of the cell #2 different from that of the serving cell.

The UE 100-1 transmits a gap allocation request to the eNB 200-1 through the cell #1 based on the resource pool information included in the SIB 19 of the cell #2 (hereinafter, referred to as "resource pool information of the cell #2").

Firstly, the gap allocation request includes feedback corresponding to the resource pool information of the cell #2. As a feedback method, there are a first feedback method and a second feedback method.

The first feedback method is a method of feeding back the resource pool information of the cell #2 without change. As a result, the eNB 200-1 can entirely detect the D2D discovery resource pool of the cell #2.

The second feedback method is a method in which the UE 100-1 decides a gap pattern based on the resource pool information of the cell #2, and feeds back the decided gap pattern (a requested gap pattern). Specifically, the UE 100-1 decides the gap pattern including timings (subframes) included in the D2D discovery resource pool of the cell #2 based on the resource pool information of the cell #2.

For example, the requested gap pattern is expressed by period information (discoveryPeriod), offset information (discoveryOffsetIndicator) indicating a start timing of the period information with respect to a timing of the serving cell, bitmap information (discoverySubframeBitmap) of a subframe unit indicating the gap pattern, and information (discoveryNumRepetition) indicating the number of repetitions of the bitmap information in the period information.

When the UE 100-1 becomes interested in the D2D discovery process at a plurality of frequencies different from the frequency of the cell #1, a sum of gap patterns of a plurality of frequencies may be set as the requested gap pattern. Alternatively, a plurality of gap patterns corresponding to the respective frequencies may be set.

FIGS. 8(a) to 8(d) are diagrams for describing an exemplary configuration of the requested gap pattern.

Figure 8:
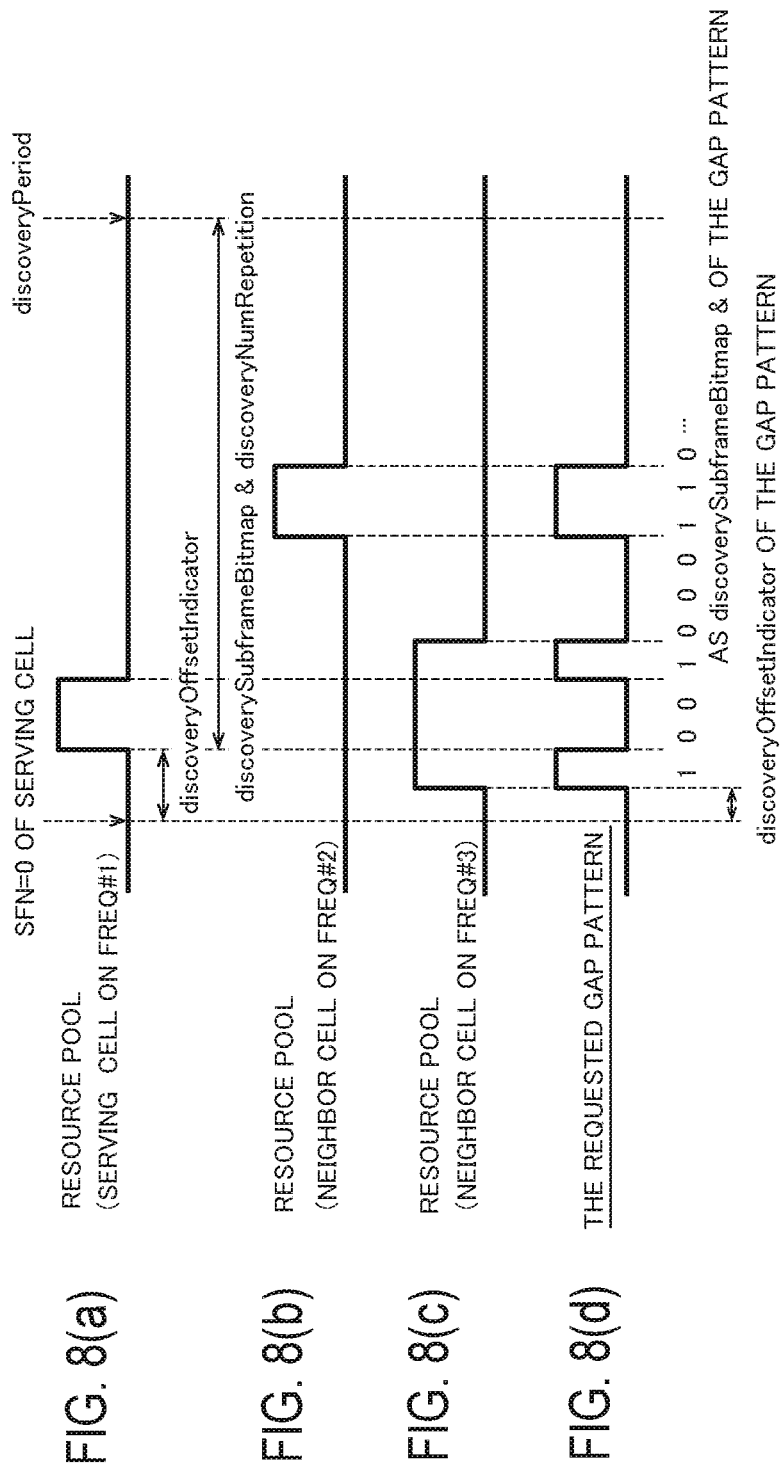
FIGS. 8(a) to 8(d) are diagrams for describing an exemplary configuration of a requested gap pattern according to an embodiment.

As illustrated in FIG. 8(a), the UE 100-1 detects the D2D discovery resource pool of the serving cell (the cell #1) belonging to the frequency #1.

As illustrated in FIGS. 8(b) and 8(c), the UE 100-1 becomes interested in the D2D discovery process at the frequency #2 and the frequency #3, acquires the SIBs 19 of the frequency #2 and the frequency #3, and detects the D2D discovery resource pools of the frequency #2 and the frequency #3.

As illustrated in FIG. 8(d), the UE 100-1 decides a gap pattern obtained by subtracting the gap pattern of the frequency #1 from a sum of the gap pattern of the frequency #2 illustrated in FIG. 8(b) and the gap pattern of the frequency #3 illustrated in FIG. 8(c) as the requested gap pattern. In the example of FIG. 8(d), the requested gap pattern is expressed by discoveryPeriod indicating a predetermined duration, discoveryOffsetIndicator indicating an offset of one subframe, discoverySubframeBitmap including a bitmap "1001000110 . . . " indicating a gap pattern of a subframe unit, and discoveryNumRepetition indicating a predetermined number of repetitions. In the bitmap, "1" indicates a subframe that constitutes the monitoring gap, and "0" indicates a subframe that does not constitute the monitoring gap. discoveryOffsetIndicator related to the gap pattern preferably has an offset value starting from SFN=0 of the cell #1.

When the UE 100-1 includes one receiver, in order to have a margin of a time required for frequency switching, a time required for frequency switching may be included in the gap pattern as a margin. For example, when one subframe is required as a switching time, one subframe before and after the monitoring gap is included in the requested gap pattern as well.

Secondly, the gap allocation request includes information indicating another frequency at which the UE 100-1 becomes interested in the D2D discovery process. In the example of FIGS. 8(a) to 8(d), the UE 100-1 includes identification information of the frequency #2 and identification information of the frequency #3 in the gap allocation request.

Thirdly, the gap allocation request may include a tag number associated with the SIB 19 which the UE 100-1 acquires at another frequency. The tag number is a number that is updated with the update of the SIB 19. The tag number is included in a SIB 1 serving as system information used for scheduling of the SIB 19. Alternatively, the tag number may be included in the SIB 19. The tag number is referred to as "systemInfoValueTag."

The gap allocation request may be included in D2D indication (ProSe indication) serving as an RRC message for the D2D proximity service.

In step S103, the eNB 200-1 that has received the gap allocation request from the UE 100-1 transmits a gap allocation response to the UE 100-1 through the cell #1.

When the first feedback method is applied, the eNB 200-1 decides the gap pattern including timings (subframes) included in the D2D discovery resource pool of the cell #2, and includes the decided gap pattern in the gap allocation response. As a result, a notification of the gap pattern decided by the eNB 200-1 is given to the UE 100-1.

On the other hand, when the second feedback method is applied, the eNB 200-1 decides whether or not the requested gap pattern of the UE 100-1 is permitted, and includes information (ACK/NACK) about whether or not the requested gap pattern of the UE 100-1 is permitted in the gap allocation response. When the requested gap pattern of the UE 100-1 is denied, the eNB 200-1 may revise the requested gap pattern of the UE 100-1 and include the revised gap pattern in the gap allocation response. The gap allocation response may be an RRC connection reconfiguration message for reconstituting an RRC setting.

As described above, the eNB 200 allocates the gap pattern specifying a timing at which the UE 100-1 monitors the D2D discovery signal transmitted from the UE 100-2 at another frequency different from the frequency of its own cell to the UE 100 based on the gap allocation request received from the UE 100-1 connected to its own cell.

Further, when the second feedback method is applied, it is possible to reduce an amount (overhead) of a control signal that is transmitted and received by the UE 100-1 and the eNB 200-1 than when the first feedback method is applied.

In step S104, the UE 100-1 monitors the D2D discovery signal of another frequency at the timing (subframe) set according to the allocated gap pattern. Through the monitoring, the UE 100-1 receives the D2D discovery signal transmitted from the UE 100-2 and discovers the UE 100-2.

Since the eNB 200-1 detects the gap pattern (the monitoring gap) set to the UE 100-1, it is possible to prevent the downlink signal (for example, the control signal such as the paging signal or the like) from being transmitted to the UE 100-1 in the monitoring gap. Further, when it is difficult to perform uplink transmission (data or feedback such as HARQ Ack/Nack) during D2D reception, it is possible to prevent allocation of uplink transmission or recognize that there is no abnormality (recognize that the inter-frequency discovery is being performed) even though it is not transmitted. Thus, the D2D discovery process can be prevented from interrupting the cellular communication.

(5) Overview of Feedback Control

In the operation environment illustrated in FIG. 7, the eNB 200-1 is assumed to further allocate the gap pattern to the UE 100-3.

The D2D discovery resource pool is considered not to dynamically change. For this reason, when the eNB 200-1 accumulates and manages the feedbacks received from the UEs 100, the necessity of the feedback by the UE 100 performing the inter-frequency discovery in the cell #1 is low. Particularly, when the first feedback method is applied, if all the UEs 100 performing the inter-frequency discovery feedback the resource pool information, the overhead is excessively increased.

In this regard, in an embodiment, an increase in the overhead associated with the feedback is controlled by enabling the eNB 200-1 to control whether or not the feedback is given.

Figure 9:
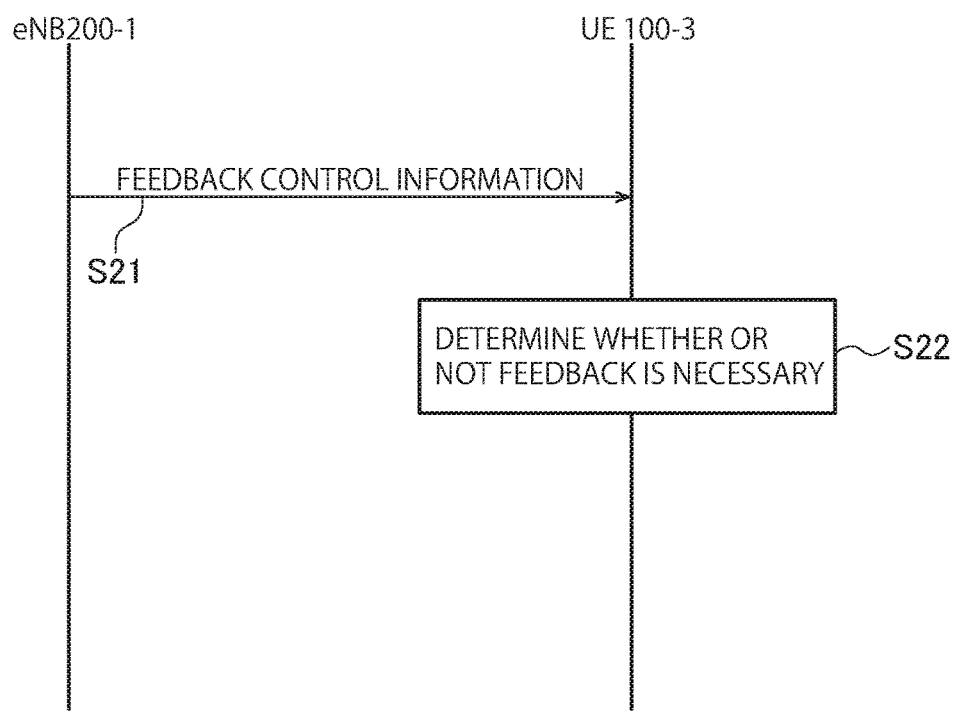
FIG. 9 is a diagram for describing feedback control according to an embodiment.

FIG. 9 is a diagram for describing feedback control according to an embodiment.

As illustrated in FIG. 9, in step S21, the eNB 200-1 transmits feedback control information used for determining whether or not it is necessary to include the feedback in the gap allocation request to the UE 100-3. As described above, the feedback refers to the resource pool information in the case of the first feedback method, and refers to the requested gap pattern in the case of the second feedback method.

The feedback control information is transmitted through broadcasting by the system information (for example, the SIB 19). Alternatively, the feedback control information may be transmitted through unicasting by individual RRC signaling.

In step S22, the UE 100-3 receives the feedback control information. The UE 100-3 determines whether or not it is necessary to include the feedback in the gap allocation request based on the feedback control information.

When it is determined to be necessary to include the feedback in the gap allocation request, the UE 100-3 includes the feedback in the gap allocation request to be transmitted to the eNB 200-1. On the other hand, when it is determined not to be necessary to include the feedback in the gap allocation request, the UE 100-3 does not include the feedback in the gap allocation request to be transmitted to the eNB 200-1.

As described above, the eNB 200-1 can determine whether or not the feedback is given, and thus it is possible to appropriately allocate the gap pattern to the UE 100-3 while suppressing the increase in the overhead associated with the feedback.

(6) Specific Example of Feedback Control

Specific examples of the feedback control will be described below.

(6.1) First Specific Example

The feedback control information includes information indicating whether or not the feedback is necessary.

The feedback control information may be provided for each frequency included in another frequency (Inter-frequency). For example, the eNB 200-1 may transmit the feedback control information indicating "feedback is necessary" for the frequency #2 and the feedback control information indicating "feedback is unnecessary" for the frequency #3.

Then, when the UE 100-3 becomes interested in the D2D discovery process at the frequency #2, the UE 100-3 includes the feedback in the gap allocation request to be transmitted to the eNB 200-1. Further, when the UE 100-3 becomes interested in the D2D discovery process at the frequency #3, the UE 100-3 does not include the feedback in the gap allocation request to be transmitted to the eNB 200-1.

(6.2) Second Specific Example

The feedback control information includes the tag number (systemInfoValueTag) of the system information (the SIB 19) acquired by the eNB 200-1 so that the UE 100 determines whether or not the feedback is necessary.

As described above, the gap allocation request includes the tag number associated with the SIB 19 which the UE 100-1 acquires at another frequency. Thus, the eNB 200-1 includes the tag number corresponding to the D2D discovery resource pool detected by the eNB 200-1 in the feedback control information, and transmits the resulting feedback control information.

The feedback control information may be provided for each frequency included in another frequency (Inter-frequency). For example, when the eNB 200-1 detects the D2D discovery resource pool of the SIB 19 of a tag number #5 for the frequency #2, the eNB 200-1 transmits the feedback control information indicating that the feedback corresponding to the SIB 19 of the tag number #5 for the frequency #2 is unnecessary.

The UE 100-3 does not acquire the SIB 19 of the tag number #5 for the frequency #2 from the eNB 200-2 (the cell #2). Alternatively, although the UE 100-3 acquires the SIB 19 of the tag number #5 for the frequency #2 from the eNB 200-2, the UE 100-3 does not include the feedback in the gap allocation request to be transmitted to the eNB 200-1. However, when the UE 100-3 acquires the SIB 19 of a tag number #6 for the frequency #2 from the eNB 200-2, the UE 100-3 includes the feedback in the gap allocation request to be transmitted to the eNB 200-1.

(6.3) Third Specific Example

When the second feedback method is applied, the feedback control information may include information indicating the gap pattern acquired by the eNB 200-1 so that the UE 100 determines whether or not the feedback is necessary. As described above, the gap pattern can be expressed by discoveryPeriod, discoveryOffsetIndicator, discoverySubframeBitmap, and discoveryNumRepetition.

The feedback control information may be provided for each frequency included in another frequency (Inter-frequency). For example, the eNB 200-1 transmits the feedback control information indicating that the feedback of a specific gap pattern is unnecessary for the frequency #2. The UE 100-3 does not include the feedback of the specific gap pattern in the gap allocation request.

(6.4) Fourth Specific Example

The feedback control information includes information indicating a valid period of time of the feedback control information. For example, the valid period of time can be expressed by a coordinated universal time (UTC).

It is desirable that the information indicating the valid period of time be included in the feedback control information of the first to third specific examples. It may be desirable that the valid period of time be set as a period of time equal to an update period of the SIB 19.

When it is within the valid period of time, the UE 100-3 that has received the feedback control information gives the feedback according to the feedback control information. However, after the valid period of time elapses, the UE 100-3 may not follow the feedback control information.

(7) Operation Flow

Figure 11:
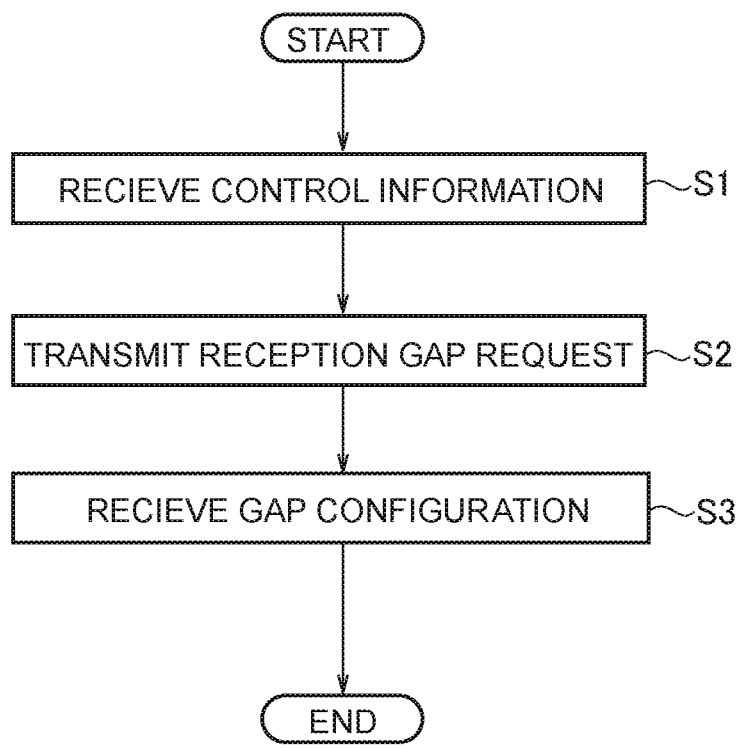
FIG. 11 is a diagram illustrating an operation flow of UE according to an embodiment.

FIG. 11 is a diagram illustrating an operation flow of UE 100 according to an embodiment. As illustrated in FIG. 11, in step S1, the processor 160 executes a process of receiving control information from the eNB 200. The control information indicates that transmission of a gap request is allowed. In step S2, the processor 160 executes a process of transmitting a reception gap request to the eNB 200. The reception gap request requests reception gaps which are timings in which the UE 100 halts a downlink reception to monitor device-to-device discovery signals directly transmitted from other UEs. The reception gap request includes: a frequency identifier indicating a frequency to be used for monitoring the device-to-device discovery signals; and a gap pattern correlated with the frequency identifier. The gap pattern includes: bit map information indicating subframes corresponding to the reception gaps; period information indicating a predetermined period by which the bit map information is repeated; and offset information indicating a start timing of the predetermined period. In step S3, the processor 160 executes a process of receiving a gap configuration from the eNB 200. The gap configuration indicates the reception gaps configured by the eNB 200 to the UE 100.

Figure 12:
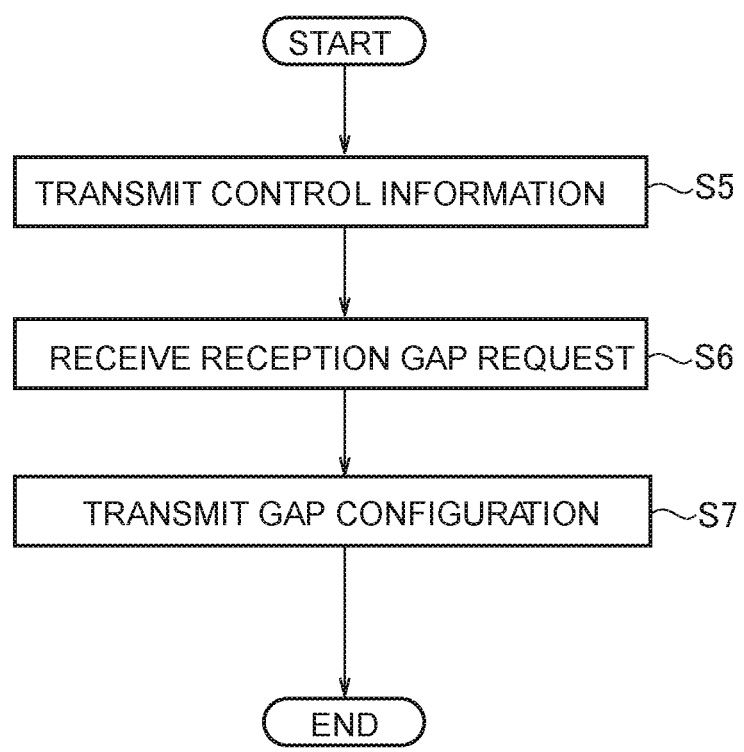
FIG. 12 is a diagram illustrating an operation flow of eNB according to an embodiment.

FIG. 12 is a diagram illustrating an operation flow of eNB 200 according to an embodiment. As illustrated in FIG. 12, in step S5, the processor 240 executes a process of transmitting control information to a UE 100. The control information indicates that transmission of a gap request is allowed. In step S6, the processor 240 executes a process of receiving a reception gap request from the UE 100. The reception gap request requests reception gaps which are timings in which the UE 100 halts a downlink reception to monitor device-to-device discovery signals directly transmitted from other UEs. The reception gap request includes: a frequency identifier indicating a frequency to be used for monitoring the device-to-device discovery signals; and a gap pattern correlated with the frequency identifier. The gap pattern includes: bit map information indicating subframes corresponding to the reception gaps; period information indicating a predetermined period by which the bit map information is repeated; and offset information indicating a start timing of the predetermined period. In step S7, the processor 240 executes a process of transmitting a gap configuration to the UE 100. The gap configuration indicates the reception gaps configured by the eNB 200 to the UE 100.

[Other Embodiments]

In the above embodiment, the example in which the SIB related to the D2D proximity service is the SIB 19 has been described. However, the information related to the D2D proximity service may be carried through a SIB (a SIBx) other than the SIB 19.

In the above embodiment, the feedback and the feedback control of the frequency units have been described, but the feedback and the feedback control may be performed in more detailed units (for example, cell units) than the frequency units. In this case, in addition to or instead of a frequency identifier, a cell identifier is transmitted and received.

In the above embodiment, the D2D discovery process (Inter-PLMN Discovery) when the PLMNs are different has been described, but the present disclosure is not limited to this example. The present disclosure can be applied even to the case of the D2D discovery process (Intra-PLMN & Inter-freq. Discovery) when the PLMNs are the same.

In the above embodiment, the eNB 200-1 acquires the discovery resource information of another PLMN from the UE 100, but the present disclosure is not limited to this example. For example, the eNB 200-1 may acquire the discovery resource information from the eNB 200-2 through the X2 interface.

In the above embodiment, the feedback control of FIG. 9 is control as to whether or not the feedback is included in the gap allocation request (for example, ProSe indication). However, when a feedback-dedicated message (for example, UE Assistance Information) is used, the control may be applied to the dedicated message.

In the above embodiment, the D2D discovery process (ProSe Discovery) has been described, but it will be appreciated that the present disclosure can be applied to the D2D communication (ProSe Communication). In other words, the "D2D discovery process" of the above embodiment may be replaced with the "D2D communication," and the "D2D discovery signal" may be replaced with the "D2D communication signal."

In the above embodiment, the LTE system has been described as an example of the mobile communication system, but the present disclosure is not limited to the LTE system and can be applied to other systems than the LTE system.

[Additional Statement]

1. Introduction

The introduction of inter-PLMN discovery was agreed.

Agreements

1 RAN2 aims to support of Inter-Frequency and Inter-PLMN discovery for monitoring UEs will be introduced.

2 An eNB may provide in SIB a list of (intra-PLMN-inter-frequency and/or inter-PLMN-inter-frequency) carriers (possibly with the corresponding PLMN ID) on which the UE may aim to receive ProSe discovery signals. A cell does not provide detailed ProSe configuration (SIB18) for other carriers. If a UE wants to receive ProSe discovery signals on another carrier, it needs to read SIB18 (and other relevant SIB) from there. [. . . ]

3 UEs transmit ProSe discovery signals only on their serving cell (if authorized by the NW).

4 Intra- and inter-frequency (and inter-PLMN) ProSe reception does not affect Uu reception (e.g. UEs use DRX occasions in IDLE and CONNECTED to perform ProSe discovery reception or it uses a second RX chain if available). The UE shall not create autonomous gaps. If the UE has to obtain ProSe discovery (2a) configuration from the SIB of an inter-frequency cell, this does not affect the UE's Uu reception on the serving cell(s).

5 An RRC CONNECTED UE interested (or no longer interested) in intra- or inter frequency ProSe discovery reception indicates this by sending a "ProSe indication" to the eNB (further restrictions to be discussed).

In following RAN2#87bis, the open issues on D2D discovery were captured but some of them were not discussed.

Open Issues [. . . ]

3) Need for additional gaps (besides DRX occasions) in which the UE can tune to other frequencies for receiving ProSe discovery signals? If so, should those be autonomous or configured? If configured, how does the eNB where to provide them?

4) Further need to clarify prioritization between Uu and PC5 transmission/reception?

In this additional statement, the open issues are discussed to support inter-frequency/inter-PLMN discovery in Rel-12.

2. Needs for Additional Gaps for Discovery Monitoring

The evaluation of D2D discovery is performed in the study phase and the result was captured in the TR. According to the system level simulation, the discovery performance, as measured by the number of devices discovered, is dependent on how many periods the UE can announce/monitor discovery signals. However, even if sufficient discovery periods are provided by the network, the number of devices discovered is contingent on the opportunities for the UEs to announce/monitor during the discovery periods. For intra-frequency discovery, since the serving cell provides the reception pools of both the serving cell and the neighbor cells, the discovery performance is guaranteed according to the rule agreed.

Figure 10:
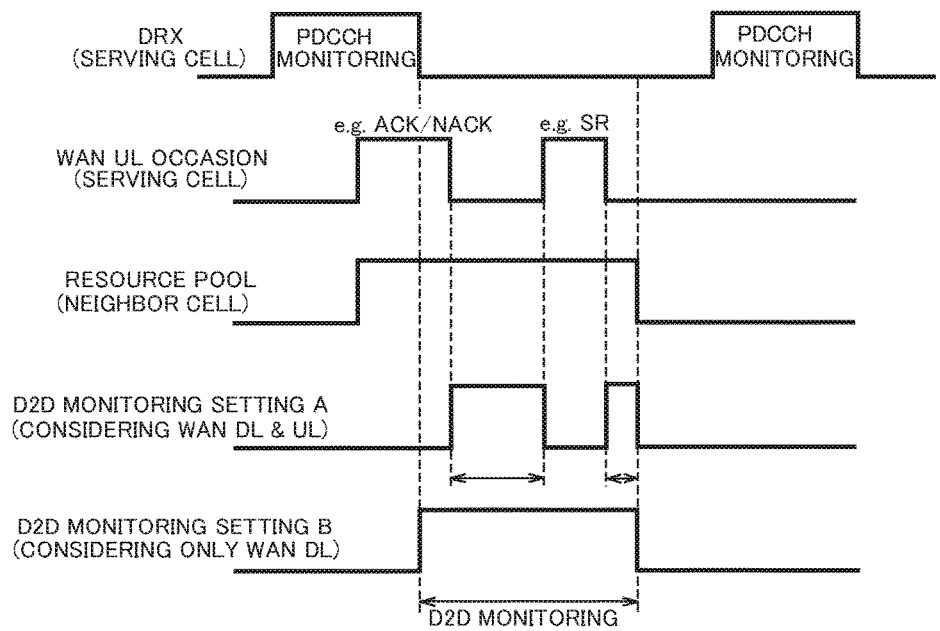
FIG. 10 is a diagram related to additional statement.

And for inter-frequency or inter-PLMN discovery, the UE, with a single Rx chain, may use DRX occasions to avoid any degradation to Uu reception, as depicted in FIG. 10. As suggested, ProSe discovery using only DRX occasion may result in degradations of the discovery performances, i.e. best-effort discovery and the number of devices discovered will be significantly limited even if there were sufficient discovery periods.

Observation 1: If only existing DRX occasions are used, discovery opportunities may be severely limited.

To ensure moderate performance for inter-frequency and inter-PLMN discovery and to realize some of the performance gains from the discovery periods provided by the network, additional gaps for discovery monitoring for should be introduced. The gaps may be based on the subframes belonging to the D2D discovery pool for the specific UL carrier based on agreements.

Proposal 1: Gaps for discovery monitoring should be introduced in addition to the existing DRX occasion.

3. Additional Gaps 3.1. Working Assumptions

To form a common view as working assumption, the knowledge of the serving cell should be clarified. With intra-PLMN discovery, it may be assumed that the serving cell has knowledge of the detailed ProSe discovery information of its neighbor cells although it's already agreed that the serving cell does not provide detailed ProSe discovery information for inter-frequency neighbour cells in SIB19. It's up to OAM or deployment policy whether the eNB is configured with such information. However, we believe such tight coordination among networks should not be extended to inter-PLMN discovery.

Confirmation 1: As a working assumption, tight coordination among PLMNs should not be assumed, while it may be assumed for intra-PLMN case.

According to the working assumption in Confirmation 1, OAM may be able to provide the necessary coordination among inter-frequency, intra-PLMN cells such that the serving cell would be able to configure the UE with appropriate gaps, e.g. DRX configuration. However, for the inter-PLMN scenario, the situation is different and no coordination among cells belonging to different PLMNs may be assumed. Therefore, the serving cell should have a means to obtain the information from the UE as suggested, since the UE may have already obtained the information directly from the other PLMN, e.g. during DRX occasion.

Proposal 2: There should be a means for the serving cell to obtain detailed ProSe discovery information from the UE.

If Proposal 2 is agreeable, we should also consider the control for the overhead associated with the transfer of detailed ProSe discovery information from the UE to the serving cell. If the serving cell were able obtain detailed ProSe discovery information through OAM, then it isn't necessary for the UE to provide such information to the serving cell. Additionally, if the serving cell already obtained such information from a UE it won't be necessary for other UEs to provide the same information, as long as the information has the same contents. Therefore, the serving cell should indicate in SIB or dedicated signalling whether the UE should provide the detailed ProSe information from inter-frequency neighbour cells.

Proposal 3: The serving cell should have a means to indicate in SIB or dedicated signalling (possibly for each frequency carrier listed in SIB19) whether the serving cell has already acquired all the inter-frequency neighbour cell information needed for assigning discovery gaps to the UE.

3.2. Additional Gap Alternatives

If Proposal 1 is agreeable, additional gap alternatives should be discussed. The possible alternatives listed below, ALT 1: Reuse the existing measurement gap.

ALT 2: Autonomous gap under permission of the serving cell.

ALT 3: New discovery gap configured by the serving cell.

ALT 4: New discovery gap configured by the serving cell, which is based on a gap pattern requested by the UE.

With ALT 1, the existing measurement gap may be a mismatch with the complex resource pool pattern and may not ensure reasonable discovery performance as described in Observation 1. The existing measurement gap is fixed at 6 subframes while the discovery period is configurable from 32-1024 radio frames. In addition, it may be necessary to clarify in the specification when the existing gap for inter-frequency measurements may be reused for discovery monitoring. Based on the rule, cellular measurement gaps are excluded for use in ProSe discovery. If the extended DRX configuration could be reused for discovery monitoring, the definition of the Power Preference Indication should be extended to allow its use for ProSe discovery. But even with such an extension, it may still not be possible to cover all the necessary discovery periods without further coordination.

Regarding ALT 2, although it was already agreed that the UE shall not create autonomous gaps, it may be useful as long as it's allowed by the serving cell, especially if the UE can obtain the patterns of resource pools of other carrier by decoding SIB19s as pointed out. This is particularly beneficial in the inter-PLMN scenario, since it is assumed that the serving cell has no knowledge of detailed ProSe discovery information belonging to inter-PLMN cells.

ALT 3 may work well in the intra-PLMN case; however, it's questionable if it will also work for inter-PLMN case due to lack of knowledge in the serving cell, as mentioned above.

ALT 4 may be considered as a harmonized solution between ALT 2 and ALT 3 and it can also provide a unified mechanism for support of both intra- and inter-PLMN discovery. Therefore, ALT 4 should be introduced as the baseline mechanism for the additional gap for discovery monitoring.

Proposal 4: The serving cell should configure the UE with gaps for inter-frequency and/or inter-PLMN discovery monitoring, which may be based on a gap pattern requested by the UE.

4. Discovery Monitoring Gap Details 4.1. Request of Gap Assignment from the UE

Assuming the UE can obtain the resource pool configurations of interest directly from the SIB of other carriers including other PLMNs, the UE could inform the serving cell of the desired gap patterns for discovery monitoring. The gap pattern should be based on the subset of the RRC parameter defined by RAN1, i.e., discoveryPeriod, discoveryOffsetIndicator, discoverySubframeBitmap and discoveryNumRepetition for the serving cell and neighbour cells. Therefore, the IE structure should be common with the parameters.

Proposal 5: The gap pattern requested by the UE should be based on the subset of the RRC parameters defined by RAN1.

Following the current agreements, the resource pool offset, which is described by discoveryOffsetIndicator, should be provided with respect to SFN=0 of the serving cell as one value.

Proposal 6: discoveryOffsetIndicator for the gap pattern in the request sent from the UE should be provided with respect to SFN=0 of the serving cell as one value.

The issue to be discussed is whether the request contains only one pattern or multiple patterns, i.e., an integrated pattern for all other carriers or separated patterns for each carrier. Although the separated patterns may allow more flexibility for the gap assignment performed in the serving cell, from overhead reduction perspective it's preferred to inform of an integrated pattern in the request.

Proposal 7: A single pattern which integrates all resource pool patterns of interest should be informed in the request from the UE.

Obviously, the request comes up with the UE's interest of discovery monitoring. Therefore, it's quite natural to include the request of gap assignment in the ProSe Indication. If Proposal 3: is acceptable, it may be also under control of the serving cell whether the UE includes the gap pattern in the request.

Proposal 8: The ProSe Indication may include the request of gap assignment with required gap pattern.

4.2. Gap Assignment as Response to the UE

Upon reception of the ProSe Indication which includes the request of gap assignment, it is up to the serving cell to decide whether to use the UE requested gap pattern for gap assignment through dedicated signalling.

Proposal 9: Upon reception of the ProSe Indication which includes the request for gap assignment, the serving cell may configure the UE with acceptable gap pattern using dedicated signalling.

The invention claimed is:

1. A user terminal, comprising:
a controller containing at least one processor and at least one memory, the controller configured to execute processes of:
  receiving control information from a first cell managed by a base station, the control information indicating whether transmission of a discovery reception gap request is allowed, wherein the first cell belongs to a first frequency;
  receiving a list of second frequencies from the first cell;
  determining to monitor device-to-device discovery signals transmitted from other user terminals located within a second cell belonging to one of the second frequencies;
  in a case that the control information indicates that a discovery reception gap request is allowed:
    transmitting a discovery reception gap request to the base station, the discovery reception gap request requesting discovery reception gaps which are timings in which the user terminal halts a downlink reception to monitor device-to-device discovery signals directly transmitted from other user terminals located within the second cell, wherein the device-to-device discovery signals are used for discovering proximal terminals; and
    receiving a discovery gap configuration from the base station, the discovery gap configuration indicating the discovery reception gaps configured by the base station to the user terminal; and
  in a case that the control information indicates that a discovery reception gap request is not allowed:
    not transmitting the discovery reception gap request to the base station, wherein
the discovery reception gap request includes:
  a frequency identifier indicating one of the second frequencies to be used for monitoring the device-to-device discovery signals; and
  a gap pattern correlated with the frequency identifier, the gap pattern including:
    bit map information indicating subframes corresponding to the discovery reception gaps requested by the user terminal, the subframes being subframes included in a discovery resource pool broadcast by the second cell and subframes representing a time required for switching between the first frequency and the one of the second frequencies;
    period information indicating a predetermined period by which the bit map information is repeated; and
    offset information indicating a start timing of the predetermined period.

2. The user terminal according to claim 1, wherein
the discovery reception gaps include a margin time required for frequency switching, and
the margin time is formed by one or more subframes.

3. The user terminal according to claim 1, wherein
the control information is included in a system information block type 19 (SIB19) broadcasted by the base station, the SIB19 used for controlling device-to-device discovery.

4. The user terminal according to claim 1, wherein
the control information is included in a dedicated radio resource control (RRC) signaling transmitted from the base station to the user terminal.

5. A base station, comprising:
a controller containing at least one processor and at least one memory, the controller configured to execute processes of:
  transmitting control information to a user terminal, the control information indicating whether transmission of a discovery reception gap request is allowed, wherein the base station manages a first cell belonging to a first frequency;
  transmitting a list of second frequencies to the user terminal, wherein the user terminal can determine to monitor device-to-device discovery signals transmitted from other user terminals located within a second cell belonging to one of the second frequencies;
  after transmitting the control information and the list of second frequencies, and in a case that the control information indicates that a discovery reception gap request is allowed:
    receiving a discovery reception gap request from the user terminal, the discovery reception gap request requesting discovery reception gaps which are timings in which the user terminal halts a downlink reception to monitor device-to-device discovery signals directly transmitted from other user terminals located within the second cell, wherein the device-to-device discovery signals are used for discovering proximal terminals; and
    transmitting a discovery gap configuration to the user terminal, the discovery gap configuration indicating the discovery reception gaps configured by the base station to the user terminal; and
  in a case that the control information indicates that a discovery reception gap request is not allowed:
    not receiving the discovery reception gap request from the user terminal, wherein
the discovery reception gap request includes:
  a frequency identifier indicating one of the second frequencies to be used for monitoring the device-to-device discovery signals; and
  a gap pattern correlated with the frequency identifier, the gap pattern including:
    bit map information indicating subframes corresponding to the discovery reception gaps requested by the user terminal, the subframes being subframes included in a discovery resource pool broadcast by the second cell and subframes representing a time required for switching between the first frequency and the one of the second frequencies;
    period information indicating a predetermined period by which the bit map information is repeated; and
    offset information indicating a start timing of the predetermined period.

6. The base station according to claim 5, wherein
the discovery reception gaps include a margin time required for frequency switching, and
the margin time is formed by one or more subframes.

7. The base station according to claim 5, wherein
the control information is included in a system information block type 19 (SIB19) broadcasted by the base station, the SIB19 used for controlling device-to-device discovery.

8. The base station according to claim 5, wherein
the control information is included in a dedicated radio resource control (RRC) signaling transmitted from the base station to the user terminal.

9. An apparatus for a user terminal, comprising:
at least one processor and at least one memory, the at least one processor configured to cause the user terminal to execute processes of:
  receiving control information from a first cell managed by a base station, the control information indicating whether transmission of a discovery reception gap request is allowed, wherein the first cell belongs to a first frequency;
  receiving a list of second frequencies from the first cell;
  determining to monitor device-to-device discovery signals transmitted from other user terminals located within a second cell belonging to one of the second frequencies;
  in a case that the control information indicates that a discovery reception gap request is allowed:
    transmitting a discovery reception gap request to the base station, the discovery reception gap request requesting discovery reception gaps which are timings in which the user terminal halts a downlink reception to monitor device-to-device discovery signals directly transmitted from other user terminals located within the second cell, wherein the device-to-device discovery signals are used for discovering proximal terminals; and
    receiving a discovery gap configuration from the base station, the discovery gap configuration indicating the discovery reception gaps configured by the base station to the user terminal; and
  in a case that the control information indicates that a discovery reception gap request is not allowed:
    not transmitting the discovery reception gap request to the base station, wherein
the discovery reception gap request includes:
  a frequency identifier indicating one of the second frequencies to be used for monitoring the device-to-device discovery signals; and
  a gap pattern correlated with the frequency identifier, the gap pattern including:
    bit map information indicating subframes corresponding to the discovery reception gaps requested by the user terminal, the subframes being subframes included in a discovery resource pool broadcast by the second cell and subframes representing a time required for switching between the first frequency and the one of the second frequencies;
    period information indicating a predetermined period by which the bit map information is repeated; and
    offset information indicating a start timing of the predetermined period.

10. The user terminal according to claim 1, wherein
the discovery reception gap request includes:
  a plurality of frequency identifiers each of which indicates a frequency to be used for monitoring the device-to-device discovery signals; and
  a plurality of gap patterns each of which is correlated with one of the frequency identifiers, the each gap pattern including the bit map information, the period information, and the offset information.

11. The base station according to claim 5, wherein the discovery reception gap request includes:
- a plurality of frequency identifiers each of which indicates a frequency to be used for monitoring the device-to-device discovery signals; and
- a plurality of gap patterns each of which is correlated with one of the frequency identifiers, the each gap pattern including the bit map information, the period information, and the offset information.

* * * * *